INTRAPLANT VOICE COMMUNICATION SYSTEM
Filed April 5, 1967 2 Sheets-Sheet 1
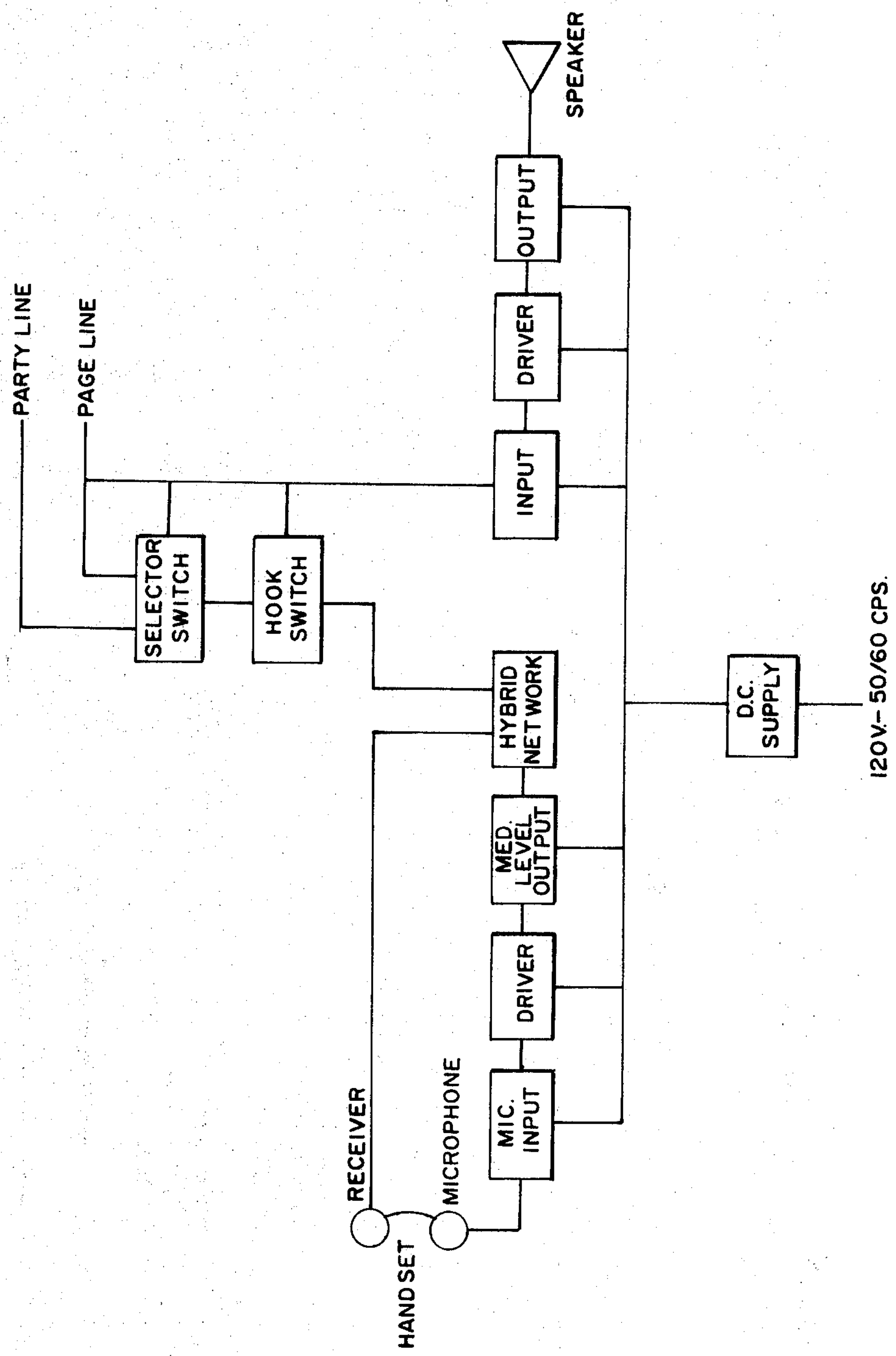
Fig. I.
INVENTOR
JOSEPH J. RADOMSKI
BY William J. Ruano
ATTORNEY Sept. 8, 1970 J. J. RADOMSKI 3,527,890

INTRAPLANT VOICE COMMUNICATION SYSTEM

Filed April 5, 1967 2 Sheets-Sheet 2

INVENTOR

BY JOSEPH J. RADOMSKI

William J. Ruano

ATTORNEY

United States Patent Office 3,527,890
Patented Sept. 8, 1970

3,527,890
INTRAPLANT VOICE COMMUNICATION SYSTEM
Joseph J. Radomski, Shillington, Pa., assignor to Gai-Tronics Corporation, Reading, Pa.
Filed Apr. 5, 1967, Ser. No. 628,610
Int. Cl. H03f *13/00*
U.S. Cl. 179—1 5 Claims

ABSTRACT OF THE DISCLOSURE

This invention is an improvement of the intraplant communication system in Pat. No. 3,080,454. It comprises two basic units, a handset amplifier with its associated power supply and enclosure and a speaker amplifier with its associated power supply and enclosure. These two assemblies form a communication station. A station combines both handset amplifier and speaker amplifier into one assembly, small enough to be housed in an enclosure of the size previously used to house only the handset or speaker amplifier. One D.C. power supply is used to power both amplifiers, thus eliminating one D.C. supply.

Since one communication station is housed in one enclosure, field wiring and installation costs are substantially reduced.

A further improvement is the absence of driver transformers from both amplifiers, resulting in reduced hum pickup caused by A.C. magnetic fields.

This invention relates to an intraplant voice communication system and which is an improvement over that covered by Pat. No. 3,080,454, assigned to the present assignee. The present system comprises two basic units, a handset amplifier with its associated power supply and enclosure and a speaker amplifier with its associated power supply and enclosure. These two assemblies form a communication station. While the circuitry of the basic units has been changed drastically from that disclosed in said patent, these units remain compatible and interchangeable with those in the patented system and may be added to such system.

The present system constitutes a significant improvement over said prior patented system since it provides a novel unit which combines both the handset amplifier and the speaker amplifier into one assembly, small enough to be housed in an enclosure of the size previously used to house only the handset or speaker amplifier. One D.C. power supply is used to power both amplifiers, thus eliminating one D.C. supply. As a result, by the present invention, one complete communication station is now housed in one enclosure, which substantially reduces field wiring and installation costs.

Another improvement in the present invention is the absence of driver transformers from both amplifiers, which results in reduced hum pickup caused by A.C. magnetic fields.

Other objects and advantages will become more apparent from a study of the following description taken with the accompanying drawings wherein:

FIG. 1 is a block diagram illustrating the component parts of a communication station embodying the present invention;

Referring more particularly to FIG. 1, it will be noted that a selector switch and hook switch of the handset are connected to the party line and page line and that signals are impressed on the input, driver, output and speaker.

A D.C. supply provides the power source therefor as well as for the microphone input, driver and medium level output.

Figure 3:
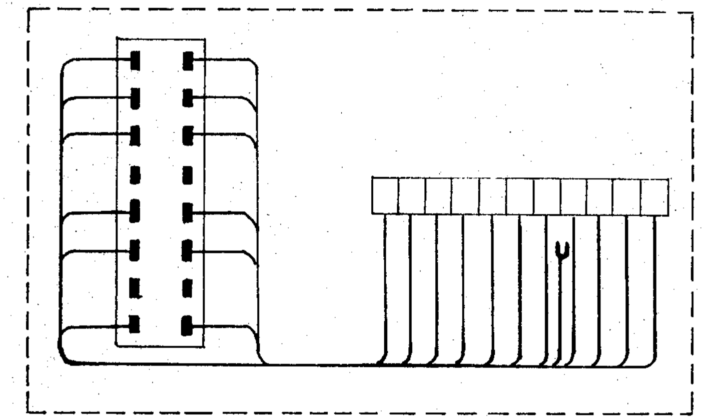
FIG. 3 is a schematic view of the terminals.
Figure 2:
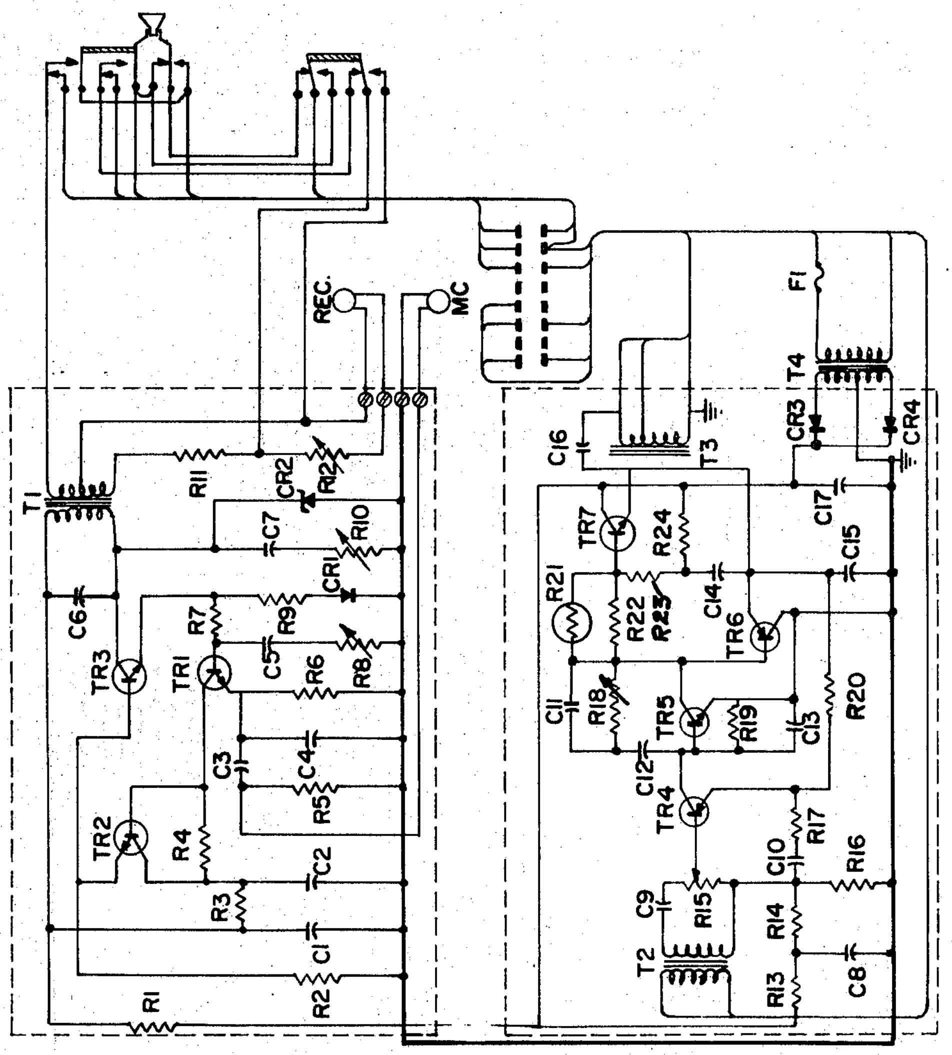
FIG. 2 is an electric circuit diagram of the communication station of the present invention.

These components will now be more fully described by referring to the circuit shown in FIG. 2.

PREAMPLIFIER CIRCUIT

The preamplifier circuit uses three transistors TR1, TR2 and TR3 in which the collector of a common base input stage TR1 is connected directly to the base of a common collector driver stage TR2, A single resistor R4 supplies current from the power supply to both the input stage TR1 collector and the driver stage TR2 base. The emitter of the driver stage TR2 is connected to common through resistor R2. This same emitter also connects directly to the base of a common emitter output stage TR3. Base bias voltage for this third stage TR3 is developed by driver TR2 emitter current flowing through the emitter resistor R2, thereby providing the correct voltage drop.

The collector of the output stage TR3 is connected to a transformer T1 primary winding. The emitter of the third stage TR3 is connected to common through a series network comprising a resistor R9 and a diode CR1. Emitter current of transistor TR3 flowing through this network develops a voltage drop across this series network. This emitter voltage is fed back to the first stage TR1 base by means of a resistor R7, thereby providing the proper bias voltage for the first stage TR1. A capacitor C5, connected from the base of the first stage TR1 to common through a rheostat R8, bypasses the A.C. voltages being fed back by the third stage TR3 emitter circuit, thereby maintaining a minimum amount of signal degeneration. The rheostat connected in series with this capacitor provides a means of controlling the amount of feedback degeneration, thereby controlling the gain of the amplifier.

Microphone MC signals are fed into the emitter circuit of the first stage TR1 by means of a capacitor C3. This capacitor C3 prevents the flow of direct current in the microphone MC and allows the emitter voltage across the emitter resistor R6 to properly rise and fall as necessitated by variations in components, temperature and supply voltage. The microphone MC is connected across a resistor R5 which is connected from the input side of the capacitor C3 to common.

A filter circuit consisting of a resistor R1 and a capacitor C1 reduces power supply ripple voltage of power being supplied to the preamplifier, as does the filter circuit consisting of resistor R3 and capacitor C2, which supplies power to the input stage TR1 and driver stage TR2.

A capacitor C4 connected from the emitter of the input stage TR1 to common prevents oscillation and eliminates radio frequency interference. A series network consisting of a capacitor C7 and a rheostat R10, connected from collector of TR3 to common negative, provides a means for variable high frequency attenuation. When the rheostat R10 is adjusted to minimum resistance value, the capacitor C7 bypasses the higher frequencies to common. A capacitor C6 is connected across the primary of the output transformer T1 to provide a high frequency roll-off characteristic to the overall frequency response of the amplifier.

The circuitry associated with the secondary winding of the output transformer T1 and concerning the balance resistor R11, the earphone or receiver Rec, the receiver volume control R12, hookswitch, selector switch and modes of operation are described in the said Pat. No. 3,080,454. No significant changes occur here except the physical changes resulting from combining the preamplifier with the power amplifier into one package.

POWER AMPLIFIER CIRCUIT

The power amplifier circuit uses two PNP transistors TR4 and TR6 and two NPN transistors TR5 and TR7. The collector of the PNP input transistor TR4 common emitter stage is connected to common through a resistor R19. This collector is also connected directly to the base of an NPN transistor TR5 common emitter driver stage. The driver transistor TR5 emitter is connected directly to common and the collector is connected directly to the base of a PNP output transistor TR6 and also through a resistor R22 and thermistor R21 parallel circuit to the base of an NPN output transistor TR7.

These complementary class "B" push-pull output transistors TR6 and TR7 operating in common collector configuration, have their emitters connected together and to an output coupling capacitor C16, which in turn is connected to an autoformer T3 having taps for properly matching loudspeakers to the output transistors TR6 and TR7. The other end of the autoformer T3 is connected to common. The NPN and PNP output stage collectors are connected to positive and common respectively. Current for the driver stage TR5 is supplied through two resistors R24 and R23 connected in series from positive to the base of the NPN output transistor TR7. Driver stage current flows through these two resistors, through a parallel circuit consisting of a resistor R22 and a thermistor R21, and through the driver transistor TR5 to common. The voltage drop across the resistor-thermistor network developed by this current flow, properly biases the output transistors TR6 and TR7 for class "B" operation. The thermistor R21 alters the bias voltage for transistors TR6 and TR7 in accordance with changes in ambient temperature. From the junction point of the two resistors R23 and R24 supplying driver stage current, a capacitor C14 is connected to the emitters of the output transistors TR6 and TR7. This capacitor C14 reduces the driving requirements of the driver stage TR5 by reducing the current feedback effect of the class "B" output circuit operating in common collector configuration and it also raises the driver stage supply voltage to a value sufficient to drive the base of the NPN output transistor TR7 into a condition of saturation, a condition which is necessary for realization of full power output of the amplifier. A resistor R20 is connected from the output stage emitters to the emitter of the input stage TR4, providing a pah for input stage current.

Base bias voltage for the input stage TR4 is provided by a resistive voltage divider network consisting of three resistors R13, R14 and R16 connected in series from positive to common of the power supply. A capacitor C8 connected from the junction of two resistors R13 and R14 to common, reduces the power supply ripple voltage in the bias circuit. The voltage developed across the resistor R16 which has one end connected to common is fed to the "off" end of an output level control R15 whose movable arm is connected to the base of the input transistor TR4. The bias voltage and emitter resistor R20 of the input transistor TR4 were selected to cause the output stage emitter voltage to equal one-half the value of the power supply voltage when delivering full power. If the output stage emitter voltage becomes higher or lower than one half the supply voltage, the input stage emitter current will change, causing the driver stage collector current to change, which in turn, causes the output stage emitter voltage to return to its proper value. A resistor R17 and a capacitor C10 connected in series from the emitter of the input transistor TR4 to the "off" end of the level control R15 reduces the signal feedback degeneration, thereby preserving the overall gain of the amplifier. The secondary winding of a bridging type input transformer T2 is connected to the level control R15 so that one end of the winding connects to the "off" end of the control while the other end of the winding feeds the high side of the control through a capacitor C9 which has a value suitable for attenuating frequencies below a selected frequency, say two hundred fifty cycles per second.

Variable high frequency attenuation is achieved by means of a series network consisting of a rheostat R18 and a capacitor C12 connected from collector to base of the driver transistor TR5. Varying the resistance of the rheostat R18 varies the frequency range of feedback from the collector to the base of the driver transistor TR5, thereby controlling the frequency response of the amplifier.

A capacitor C11 of suitable value is connected in parallel with the rheostat R18 to provide a high frequency roll-off characteristic to the overall frequency response of the amplifier. A capacitor C13 is connected from base to emitter of the driver transistor TR5 to prevent oscillation, reduce distortion and eliminate radio frequency interference; a capacitor C15 is connected from collector to emitter of the PNP output transistor TR6 for the same purposes.

The primary winding of the bridging input transformer T2 is used in the same fashion as were the previous speaker amplifier input transformers, except under this new system the level control is applied to the secondary circuit, resulting in a better balanced floating primary circuit.

Thus it will be seen that I have provided an efficient and highly improved intraplant voice communication system which combines both the handset amplifier and speaker amplifier into one assembly, powered by a single D.C. power supply, instead of two as previously required, and small enough to be housed in an enclosure of the size previously used to house only the handset or speaker amplifier, thus reducing field wiring and installation costs; also I have provided a novel communication system devoid of driver transformers in both amplifiers resulting in reduced hum pickup caused by A.C. magnetic fields, also which is compatible with units of the system covered by said prior patent and which may be readily added thereto.

While I have illustrated and described a single specific embodiment of my invention, it will be understood that this is by way of illustration only, and that various changes and modifications may be made within the contemplation of my invention and within the scope of the following claims.

I claim:

1. An intraplant voice communication system comprising a plurality of separate stations joined by a party line and a page line; each station including a loudspeaker and associated amplifier and a handset and handset preamplifier, both said amplifier and preamplifier being housed in a single enclosure and powered by a single D.C. supply source, said handset preamplifier comprising three transistors, the first comprising a common base input stage, the second comprising a common collector driver stage, and the third comprising a common emitter output stage, the collector of said first transistor being directly connected to the base of said second transistor, a single resistor supplying current from said supply source to both the collector of said first transistor and the base of said second transistor, a second transistor for connecting the emitter of said second transistor to a common base, said emitter of said second transistor being connected to the base of said third transistor, base bias voltage for said third transistor being developed by the emitter current of said second transistor flowing through said second resistor for providing the correct voltage drop.

2. A system as recited in claim 1 wherein the emitter of said third transistor is connected to a common base through a series network comprising a resistor and a diode so that the emitter current through said network develops a voltage drop.

3. A system as recited in claim 2 together with a third resistor connected between the base of said first transistor and the emitter of said third transistor to feed back emitter voltage from the third transistor to the base of the first transistor to provide proper bias voltage for said first transistor, and a capacitor and a rheostat serially connected between the base of said first transistor to the common base for bypassing A.C. voltage being fed back by the emitter of said third transistor, thereby controlling the gain of the amplifier and minimizing signal degeneration.

4. A system as recited in claim 1 wherein microphone signals of said handset are fed into the emitter circuit of said first transistor through a capacitor which prevents flow of D.C. in the microphone and allows the emitter voltage across a resistor connected to the emitter of said first transistor to properly rise and fall as necessitated by variations in temperature and supply voltage, said microphone being connected across a resistor which is connected from the input side of said last mentioned capacitor to the common base.

5. A system as recited in claim 1 together with a capacitor connected from the emitter of the input stage of said first transistor to the common base to prevent oscillation and eliminate radio frequency interference and a series network comprising a capacitor and a rheostat connected between the collector of said third transistor and said common base for variable high frequency attenuation.

References Cited

UNITED STATES PATENTS

| | | | |
|---|---|---|---|
| 2,887,542 | 5/1959 | Blair et al. | 330—20 |
| 3,080,454 | 3/1963 | Wenrich et al. | 179—28 |
| 3,260,946 | 7/1966 | Beres et al. | 330—25 |
| 3,301,955 | 1/1967 | Clements. | |
| 3,413,562 | 11/1968 | Hartin et al. | 330—20 |

KATHLEEN H. CLAFFY, Primary Examiner

J. S. BLACK, Assistant Examiner

U.S. Cl. X.R.

330—20, 25